(12) United States Patent
Tikhov et al.

(10) Patent No.: US 7,353,997 B2
(45) Date of Patent: Apr. 8, 2008

(54) RFID BARCODE AND RFID BARCODE READING SYSTEM

(75) Inventors: Yuri Tikhov, Suwon-si (KR); Young-hoon Min, Anyang-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/455,214

(22) Filed: Jun. 19, 2006

(65) Prior Publication Data

US 2007/0164121 A1    Jul. 19, 2007

(30) Foreign Application Priority Data

Jan. 13, 2006   (KR)   .................... 10-2006-0003981

(51) Int. Cl.
*G06K 7/10*   (2006.01)

(52) U.S. Cl. .................. 235/462.01; 340/572.7

(58) Field of Classification Search ............... 235/492, 235/462.01; 340/572.1, 572.8, 572.4, 10.4, 340/10.5, 572.7
See application file for complete search history.

(56) References Cited

U.S. PATENT DOCUMENTS

| | | | |
|---|---|---|---|
| 5,444,223 A | * | 8/1995 | Blama .................. 235/435 |
| 5,453,405 A | | 9/1995 | Fan et al. |
| 5,604,485 A | * | 2/1997 | Lauro et al. ............ 340/572.5 |
| 5,818,019 A | * | 10/1998 | Irwin et al. ............ 235/375 |
| 5,945,938 A | | 8/1999 | Chia et al. |
| RE37,956 E | * | 1/2003 | Blama .................. 235/435 |
| 2004/0195319 A1 | * | 10/2004 | Forster ................. 235/385 |

FOREIGN PATENT DOCUMENTS

| | | |
|---|---|---|
| DE | 43 38 554 A1 | 5/1994 |
| EP | 1 065 623 A2 | 1/2001 |
| EP | 1 585 056 A1 | 12/2005 |
| JP | 2001-155510 A | 6/2001 |

OTHER PUBLICATIONS

Jalaly, I.; Robertson, I.D.; RF Barcodes Using Multiple Frequency Bands; Microwave Symposium Diggest, 2005 IEEE MTT-S International; Jun. 12-17, 2005 pp. 4pp; Digital Object Indentifier 10.1109/MWSYM.2005.1516542.*

I. Jalay, et al., "RF Barcodes Using Multiple Frequency Bands", 2005 IEEE.

* cited by examiner

*Primary Examiner*—Michael G. Lee
*Assistant Examiner*—Tuyen Kim Vo
(74) *Attorney, Agent, or Firm*—Sughrue Mion, PLLC

(57) ABSTRACT

A radio frequency identification (RFID) barcode includes a plurality of sets of conductive strips and a plurality of inductors, wherein each of the plurality of sets of conductive strips respectively includes a plurality of conductive strips separated by at least one gap, and each of the plurality of inductors is disposed in the at least one gap of a corresponding set of conductive strips and connects two of the plurality of conductive strips of the corresponding set of conductive strips. The sets of conductive strips are arranged in parallel and separated from one another in a predetermined distance. The RFID barcode may further include a dielectric substrate supporting the sets of conductive strips and the inductors, and a metal layer provided on all of a rear surface of the dielectric substrate.

16 Claims, 4 Drawing Sheets

RFID BARCODE AND RFID BARCODE READING SYSTEM

CROSS-REFERENCE TO RELATED APPLICATIONS

This application claims priority from Korean Patent Application No. 10-2006-0003981, filed Jan. 13, 2006 in the Korean Intellectual Property Office, the entire contents of which are incorporated herein by reference.

BACKGROUND OF THE INVENTION

1. Field of the Invention

Apparatuses and systems consistent with the present invention relate to radio frequency identification (RFID) barcodes and RFID barcode reading system using RFID barcodes, and more particularly, to an RFID barcode including inductors to tune a resonant frequency and a RFID barcode reading system using the RFID barcode.

2. Description of the Related Art

To identify product information, technologies such as RFID and barcodes have been employed. In barcode reading, an optical scanner reads a barcode arranged as a sequence of black strips and identifies information corresponding to the barcode that is read. RFID is a technology in which a reading device radiates an electromagnetic wave to a tag that incorporates an integrated circuit (IC) having tag information stored in a memory, and the tag transmits the tag information in a radio frequency (RF) signal format to the reader so that the reader can identify the tag information.

The RFID tag is more expensive than the barcode, because the RFID includes the IC and memory. However, the RFID can provide more varied information than is possible with a barcode.

Meanwhile, the RFID barcode has been suggested as another alternative to the wireless reading method. RFID barcodes are discussed in I. Jalaly and I. D. Robertson, "RF Barcode Using Multiple Frequency Bands", published in the IEEE MTT-S Digest of June 2005.

According to Jalaly, et al., an RFID barcode is implemented as plural conductive strips arranged in the form of a conventional barcode. Therefore, a reader senses RFID barcode information using a return echo signal that is returned from the RFID barcode in response to electromagnetic energy emitted by the reader.

However, the conventional RFID barcode tunes resonant frequency bands of each conductive strip by adjusting the length and width of each conductive strip. As a result, precise tuning of resonant frequency bands is difficult with such length and width adjustments of the conductive strips.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a low-cost micro RFID barcode in which a resonant frequency band may be precisely tuned by providing inductors in gaps between sets of conductive strips and an RFID barcode reading system for such an RFID barcode.

According to an aspect of the present invention, there is provided a radio frequency identification (RFID) barcode, comprising a plurality of sets of conductive strips and a plurality of inductors, wherein each of the plurality of sets of conductive strips respectively includes a plurality of conductive strips separated by at least one gap, and each of the plurality of inductors is disposed in the at least one gap of a corresponding set of conductive strips and connects two of the plurality of conductive strips of the corresponding set of conductive strips.

The plurality of sets of conductive strips may be arranged in parallel and the plurality of sets of conductive strips separated from each other by a predetermined distance.

The RFID barcode may further comprise a dielectric substrate which supports the plurality of sets of conductive strips and the plurality of inductors.

The RFID barcode may further comprise a metal layer disposed on all of a rear surface of the dielectric substrate.

Alternatively, the RFID barcode may further comprise a metal layer disposed on a part of a rear surface of the dielectric substrate.

Further, the plurality of conductive strips of each of the plurality of sets of conductive strips may comprise a first conductive strip and a second conductive strip separated by the gap, and each of the plurality of inductors has a first end connected to the first conductive strip of corresponding set of conductive strips and a second end connected to the second conductive strip of the corresponding set of conductive strips.

Additionally, the inductor may be a meander-shaped metal thin film, and the conductive strip may be bulk-wire-shaped.

According to another aspect of the present invention, there is provided an RFID barcode reading system comprising an RFID barcode comprising a plurality of sets of conductive strips and a plurality of inductors, wherein each of the plurality of sets of conductive strips respectively includes a plurality of conductive strips separated by at least one gap, and each of the plurality of inductors is disposed in the at least one gap of a corresponding set of conductive strips and connects two of the plurality of conductive strips of the corresponding set of conductive strips; and an RFID barcode reader which emits an electromagnetic wave to the RFID barcode and receives a return echo from the RFID barcode.

The RFID barcode may further comprise a dielectric substrate supporting the plurality of sets of conductive strips and the inductors.

Additionally, the RFID barcode may further comprise a metal layer disposed on all of a rear surface of the dielectric substrate, or a metal layer formed on a part of the rear surface of the dielectric substrate.

BRIEF DESCRIPTION OF THE DRAWINGS

The above and other aspects of the present invention will become more apparent by describing in detail exemplary embodiments thereof with reference to the attached drawing figures, wherein.

DETAILED DESCRIPTION OF THE EXEMPLARY EMBODIMENTS

Hereinafter, exemplary embodiments of the present invention will be described in detail with reference to the accompanying drawing figures.

Figure 1:
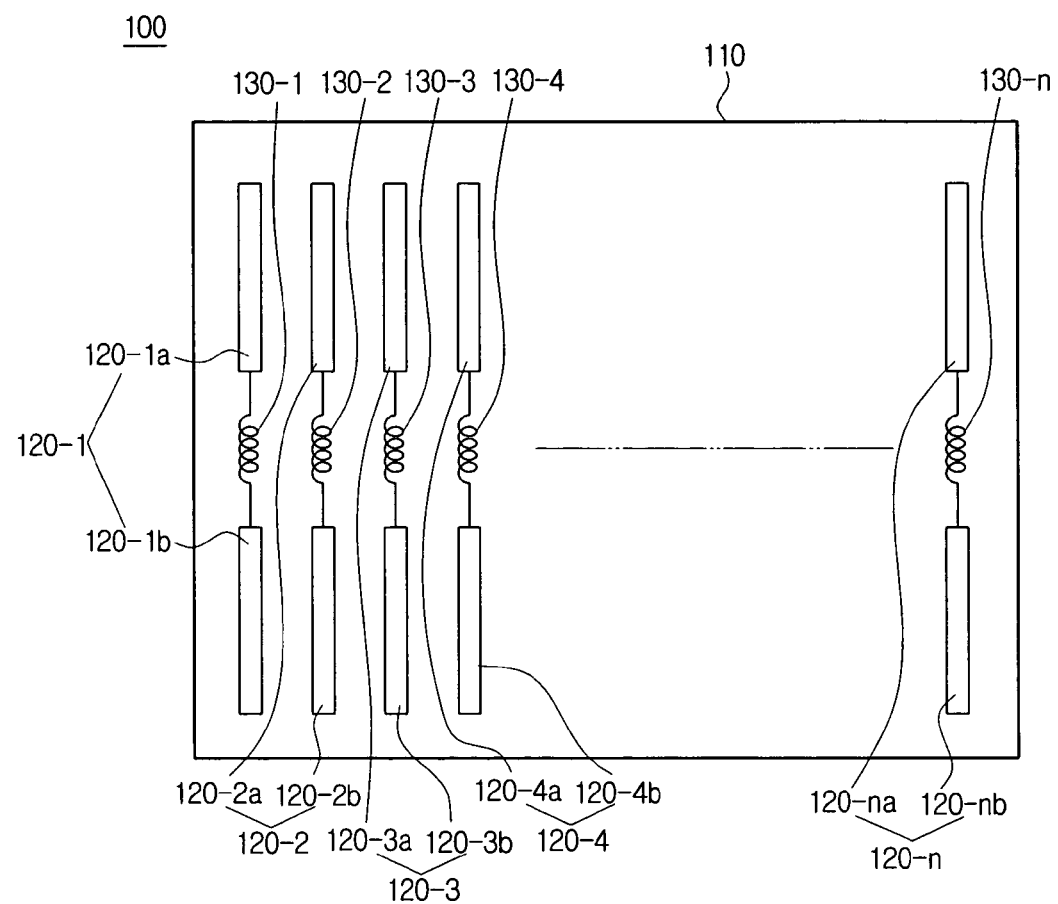
FIG. 1 is a schematic diagram showing the configuration of an RFID barcode according to an exemplary embodiment of the present invention.

FIG. 1 is a schematic diagram showing the configuration of an RFID barcode according to an exemplary embodiment of the present invention. According to FIG. 1, the RFID barcode 100 includes a dielectric substrate 110, plural sets of conductive strips 120-1 to 120-n, plural inductors 130-1 to 130-n.

Each of set of conductive strips includes one of first conductive strips 120-1a to 120-na and one of second conductive strips 120-1b to 120-nb which are separated by a predetermined gap.

The inductors 130-1 to 130-n are located in the gaps. One end of each inductor 130-1 to 130-n is connected to a corresponding strip of the first conductive strips 120-1a to 120-na, and the other end of each inductor 130-1 to 130-n is connected to a corresponding strip of the second conductive strips 120-1b to 120-nb. For example, in FIG. 1, the first inductor 130-1 is formed in the gap between the first conductive strip 120-1a and the second conductive strip 120-1b which are located on the left end of the RFID barcode. Accordingly, the inductance value of each set of conductive strips 120-1 to 120-n varies according to the inductor 130-1 to 130-n so that the resonant frequency are tuned.

As a result, the inductors 130-1 to 130-n having the different inductance values are inserted so that the resonant frequency of each set of conductive strips 120-1 to 120-n can be set differently without adjusting the length and width thereof.

Meanwhile, the inductors 130-1 to 130-n can be fabricated simply by bonding a metal film in a predetermined form, and are more cost-effective and smaller than a capacitor. Therefore, although the inductors 130-1 to 130-n are inserted, the entire size of the RFID barcode 100 can be compact.

Figure 2:
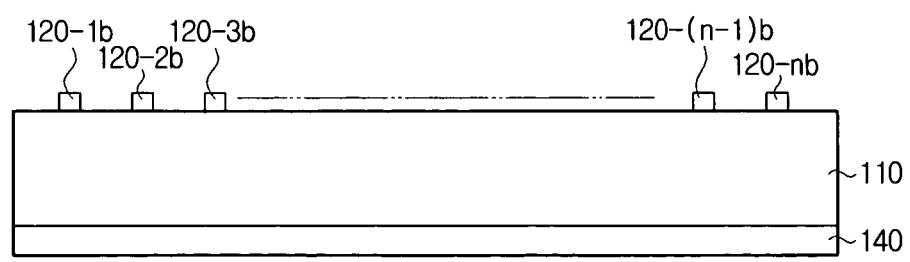
FIG. 2 is a cross-sectional view showing the configuration of the RFID barcode of FIG. 1.

FIG. 2 is a cross-sectional view showing the second conductive strips 120-1b to 120-nb on the RFID barcode 100 of FIG. 1. According to FIG. 2, the plural second conductive strips 120-1b to 120-nb are formed on the dielectric substrate 110. Meanwhile, a metal layer 140 can be bonded under the bottom of the dielectric substrate 110.

FIG. 2 shows an exemplary embodiment in which the metal layer 140 is entirely bonded under the bottom of the dielectric substrate 110. If the metal layer 140 is bonded thereunder, the RFID barcode operates as a micro strip resonator with the sets of conductive strips 120-1 to 120-n. Accordingly, if the metal layer 140 is bonded thereunder and the resonant frequency is the same, the length of the sets of conductive strips 120-1 to 120-n can be implemented to be shorter. However, if the metal layer 140 is entirely bonded under the bottom of the dielectric substrate 110, interference by the metal layer 140 may occur while reading the RFID barcode 100 on the bottom side of the dielectric substrate 110. Thus, the reading range could be shorter as a result.

Accordingly, by partly bonding the metal layer 140 under the bottom of the dielectric substrate 110, the reading range and size of the sets of conductive strips 120-1 to 120-n can be properly adjusted. The metal layer 140 can be generally formed of metal material and also can be formed of the same material as the sets of conductive strips 120-1 to 120-n.

Figure 3:
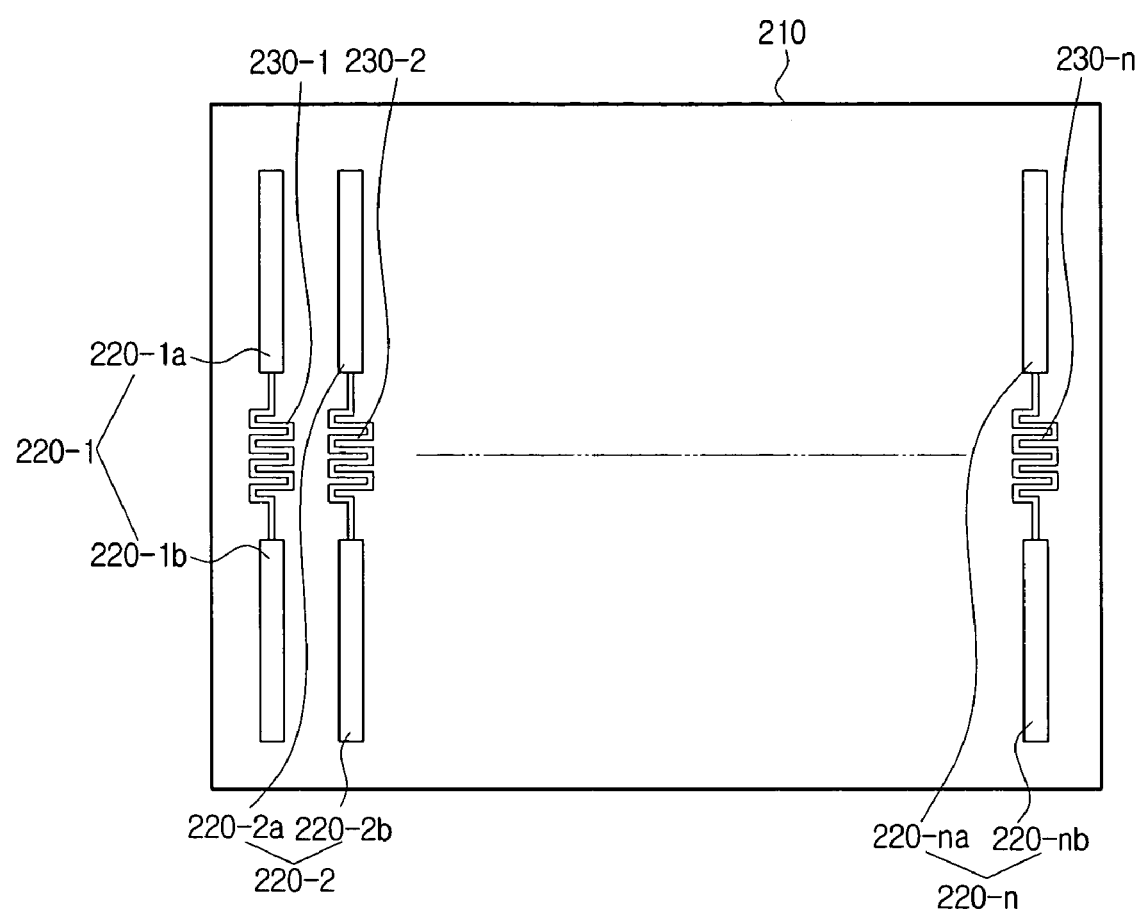
FIG. 3 is a schematic diagram showing the configuration of an RFID barcode having meander-shaped inductors.

FIG. 3 is a schematic diagram showing the configuration of an RFID barcode having meander-shaped inductors according to another exemplary embodiment. The RFID barcode according to FIG. 3 includes a dielectric substrate 210 and plural sets of conductive strips 220-1 to 220-n as in FIG. 1. In addition, a metal layer (not shown) can be bonded entirely or partly under the bottom of the dielectric substrate 210 as in FIG. 2. As the configuration of the dielectric substrate 210 and plural sets of conductive strips 220-1 to 220-n are the same as that of FIG. 1, further description will be omitted.

According to FIG. 3, inductors 230-1 to 230-n can be implemented with a meander-shaped metal thin film. In the RFID barcode, the sets of conductive strips 220-1 to 220-n of the metal film and the inductors 230-1 to 230-n can be fabricated at the same time by bonding a conductive material film on the upper surface of the dielectric substrate 210 and etching using a patterning mask.

Alternatively, the sets of conductive strips 220-1 to 220-n can be fabricated in the bulk wire form. That is, the sets of conductive strips 220-1 to 220-n can be formed by bonding a separately fabricated bulk wire on the dielectric substrate 210.

Meanwhile, the number of gaps per set of conductive strips and the number of inductor inserted in the gap can vary according to another exemplary embodiment of the present invention.

Figure 4:
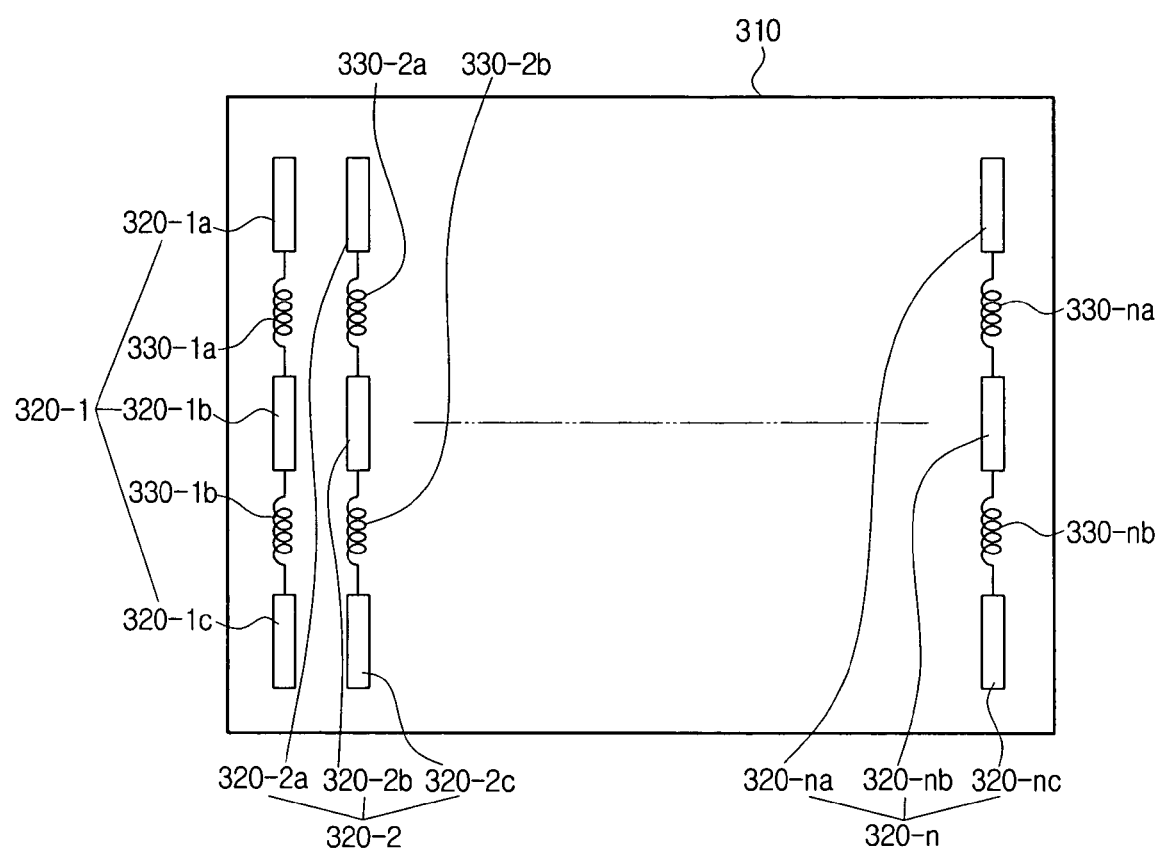
FIG. 4 is a schematic diagram showing the configuration of an RFID barcode having two inductors per conductive strip.

FIG. 4 is a schematic diagram showing the configuration of an RFID barcode having plural sets of conductive strips, wherein each set includes three conductive strips. According to FIG. 4, each of plural sets of conductive strips 320-1 to 320-n are formed on a dielectric substrate 310 such that two gaps are disposed between the strips of a respective set. Accordingly, first conductive strips 320-1a to 320-na, second conductive strips 320-1b to 320-nb, and third conductive strips 320-1c to 320-nc respectively are separated on the basis of the each gap.

First inductors 330-1a to 330-na respectively are located between the first conductive strips 320-1a to 320-na and the second conductive strips 320-1b to 320-nb, and second inductors 330-1b to 330-nb respectively are located between the second conductive strips 320-1b to 320-nb and the third conductive strips 320-1c to 320-nc. Therefore, resonant frequencies corresponding to each set of conductive strips 320-1 to 320-n are determined.

Figure 5:
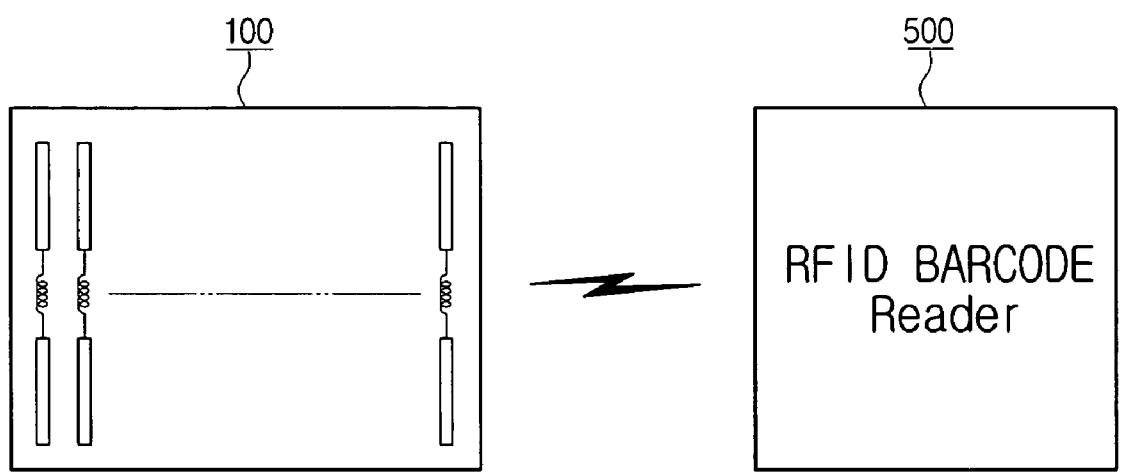
FIG. 5 is a schematic diagram showing the configuration of an RFID barcode reading system according to an exemplary embodiment of the present invention.

FIG. 5 is a schematic diagram showing the configuration of an RFID barcode reading system according to an exemplary embodiment of the present invention. According to FIG. 5, the RFID barcode reading system includes a RFID barcode 100 and a RFID barcode reader 500.

The configurations shown in FIGS. 1 to 4 can be applied to the RFID barcode 100. That is, the RFID barcode 100 includes plural sets of conductive strips and at least one gap between conductive strips in each set. Each gap includes at least one inductor. The inductor can be formed in the meander form. Additionally, the plural sets of conductive strips and inductors are supported by a dielectric substrate and a metal layer can be bonded entirely or partly under the bottom of the dielectric substrate.

The RFID barcode reader 500 emits electromagnetic energy to the RFID barcode 100. Accordingly, each set of conductive strips in the RFID barcode 100 operates as a resonator with corresponding resonant frequency. Consequently, the frequency feature of the return echo signal from the RFID barcode 100 varies according to each set of conductive strips. The RFID barcode reader 500 receives the return echo and confirms presence and absence of the resonant frequency to sense the item identification (ID) of the RFID barcode 100. If the number of sets of conductive strips in the RFID barcode 100 is n, the number of item IDs which the RFID barcode 100 can display becomes $2^n-1$.

As operation of RFID barcode reading is described in "RF Barcode Using Multiple Frequency Bands" by Jalaly, et al., which was mentioned above, further description will be omitted.

As can be appreciated from the above description, in accordance with an aspect of the present invention, inductors are inserted in each of plural sets of conductive strips so that a resonant frequency band can be tuned differently while the shape and size of the conductive strips may be the same. Thus, the RFID barcode can be easily fabricated. In addition, as the inductor which is more cost-effective and smaller than an element such as a capacitor is used, the RFID barcode can be reduced in size and fabricated at low cost.

While the invention has been shown and described with reference to certain exemplary embodiments thereof, it will be understood by those skilled in the art that various changes in form and details may be made therein without departing from the spirit and scope of the invention as defined by the appended claims and equivalents thereof.

What is claimed is:

1. A radio frequency identification (RFID) barcode comprising:
    a plurality of sets of conductive strips, wherein each of the plurality of sets of conductive strips respectively includes a plurality of conductive strips separated by at least one gap; and
    a plurality of inductors, wherein each of the plurality of inductors is disposed in the at least one gap of a corresponding set of conductive strips and connects two of the plurality of conductive strips of the corresponding set of conductive strips,
    wherein the sets of conductive strips and the inductors are arranged in rows to form a barcode.

2. The RFID barcode of claim 1, wherein the plurality of sets of conductive strips are respectively arranged in parallel and separated from each other by a predetermined distance.

3. The RFID barcode of claim 1, further comprising a dielectric substrate which supports the plurality of sets of conductive strips and the plurality of inductors.

4. The RFID barcode of claim 3, further comprising a metal layer which is disposed on all of a rear surface of the dielectric substrate.

5. The RFID barcode of claim 3, further comprising a metal layer disposed on a part of a rear surface of the dielectric substrate.

6. The RFID barcode of claim 1, wherein the plurality of conductive strips of each of the plurality of sets of conductive strips comprises a first conductive strip and a second conductive strip separated by the gap, and each of the plurality of inductors has a first end connected to the first conductive strip of corresponding set of conductive strips and a second end connected to the second conductive strip of the corresponding set of conductive strips.

7. The RFID barcode of claim 1, wherein each of the plurality of inductors is a meander-shaped metal thin film.

8. The RFID barcode of claim 1, wherein each of the conductive strips is bulk-wire-shaped.

9. A radio frequency identification (RFID) barcode reading system comprising:
    an RFID barcode comprising a plurality of sets of conductive strips and a plurality of inductors, wherein each of the plurality of sets of conductive strips respectively includes a plurality of conductive strips separated by at least one gap, and each of the plurality of inductors is disposed in the at least one gap of a corresponding set of conductive strips and connects two of the plurality of conductive strips of the corresponding set of conductive strips; and
    an RFID barcode reader which emits an electromagnetic wave to the RFID barcode and receives a return echo from the RFID barcode,
    wherein the sets of conductive strips and the inductors are arranged in rows to form a barcode.

10. The RFID barcode reading system of claim 9, wherein the plurality of sets of conductive strips are respectively arranged in parallel separated from each other by a predetermined distance.

11. The RFID barcode reading system of claim 9, wherein the RFID barcode further comprises a dielectric substrate which supports the plurality of sets of conductive strips and the plurality of inductors.

12. The RFID barcode reading system of claim 9, wherein the RFID barcode further comprises a metal layer disposed on all of a rear surface of the dielectric substrate.

13. The RFID barcode reading system of claim 9, wherein the RFID barcode further comprises a metal layer disposed on a part of the rear surface of the dielectric substrate.

14. The RFID barcode reading system of claim 9, wherein the plurality of conductors of each of the plurality of sets of conductive strips comprises a first conductive strip and a second conductive strip separated by the gap, and each of the plurality of inductors has a first end connected to the first conductive strip of corresponding set of conductive strips and a second connected to the second conductive strip of the corresponding set of conductive strips.

15. The RFID barcode of claim 9, wherein each of the plurality of inductors is a meander-shaped metal thin film.

16. The RFID barcode of claim 9, wherein each of the conductive strips is bulk-wire-shaped.

* * * * *